March 7, 1967 G. O. CROWTHER ETAL 3,308,281
SUBTRACTING AND DIVIDING COMPUTER

Filed Nov. 12, 1964 2 Sheets-Sheet 1

INVENTORS
GERALD O. CROWTHER &
GEORGE C. DELI
BY

AGENT

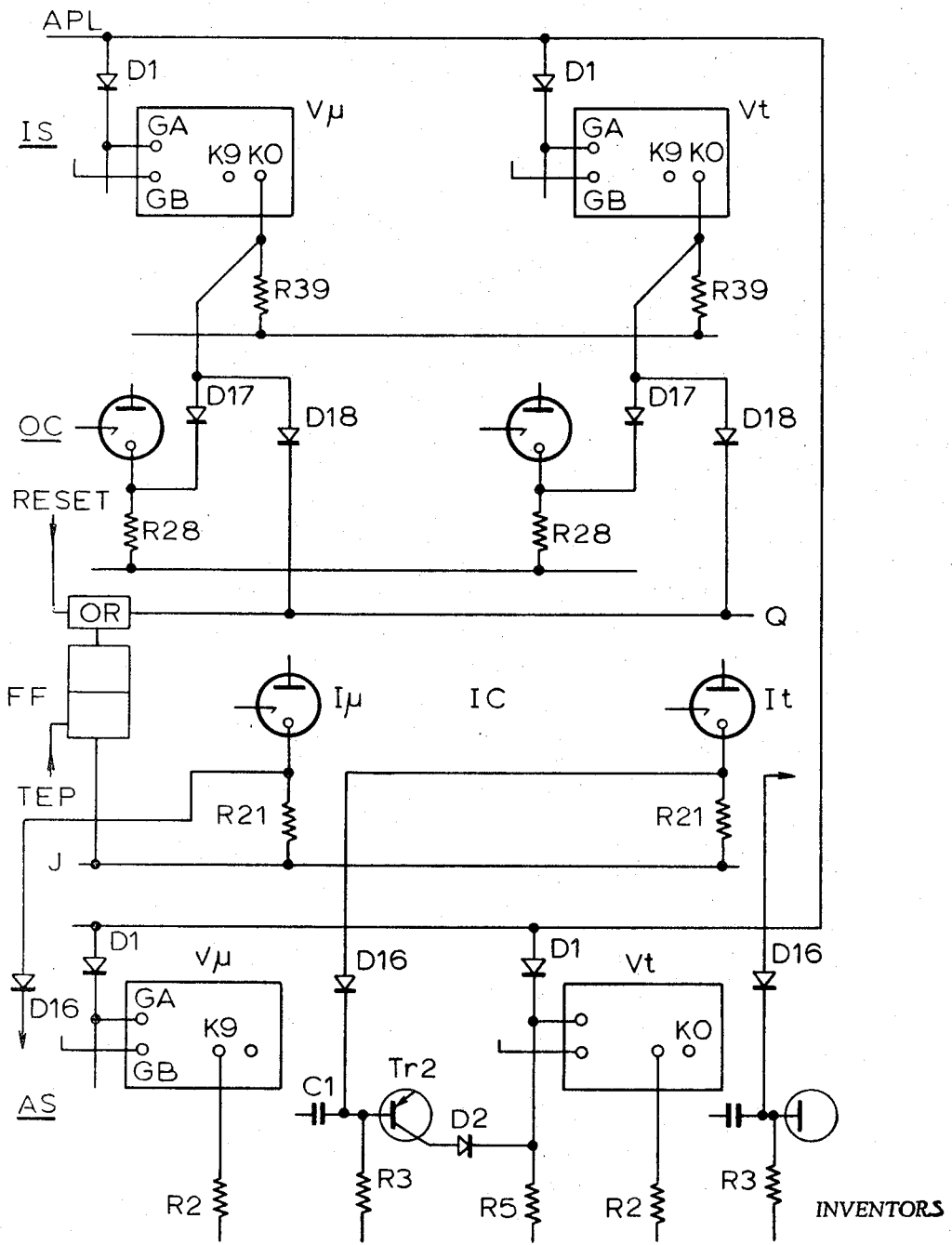

United States Patent Office 3,308,281
Patented Mar. 7, 1967

3,308,281
SUBTRACTING AND DIVIDING COMPUTER
Gerald Offley Crowther, Cheam, and George Charles
Deli, Carshalton, England, assignors to North American
Philips Company, Inc., New York, N.Y., a corporation of Delaware
Filed Nov. 12, 1694, Ser. No. 410,583
Claims priority, application Great Britain, Nov. 12, 1963, 44,647/63
2 Claims. (Cl. 235—160)

This invention relates to a computing machine having means for performing subtraction and division processes.

According to one aspect of the present invention a computing machine comprises an electronic accumulator store for storing a first number with decimal point information, an electronic input store for storing a second number with decimal point information, and means operable to subtract the second number from the first number by a process which includes the steps of deriving the nines complement of the second number and adding this nines complement to the first number in the accumulator store so as to cause the accumulator store to register the difference between the two numbers.

In this context the term "nines complement" is that number which is obtained by subtracting each digit of a given number from nine. Thus, for instance, the nines complement of 4 is 5 and the nines complement of 21 is 78; the nines complement of 653 is 346, and the nines complement of 002100 is 997899.

According to another aspect of the present invention a machine having electronic accumulator and input stores has means for dividing a first number by a second number and for storing the result in the accumulator store, the process of division including the steps of deriving the nines complement of the first number and transferring this complement to the accumulator store, adding the second number repeatedly to the said complement in the accumulator store, together with means for counting the number of times the second number has been added to the said nines complement and to store said count in the accumulator store whereby at the end of the process the result of the division is stored in the accumulator store.

According to a further aspect a computing machine is operable to effect subtraction from a first number of a second number, and comprises an electronic accumulator store for storing the first number with decimal point information, an electronic input store for receiving the second number with decimal point information, and means for subtracting the second number from the first number by adding to the first number the nine complement of the second number. In such a machine each digit of the nines complement of the second number may be obtained by deriving a pulse train of which the number of pulses is the same as the tens complement of a digit of the second number and then disregarding one pulse of the train: suitably, the first pulse of the train is disregarded.

In order that the invention may be readily understood embodiments will now be described with reference to the accompanying diagrammatic drawings in which:

FIGURE 2 illustrates an arrangement of circuit interconnection.

Figure 1:
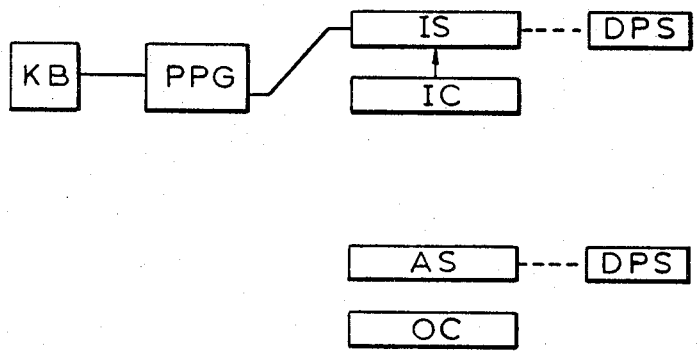
FIGURE 1 illustrates a computing machine in block diagram form.

Referring to the FIGURE 1, this illustrates in block diagram form a computing machine comprising a keyboard KB provided with a single set of ten keys labelled "1" to "0," and "SUBTRACT," "DECIMAL POINT" and "DIVIDE" keys. The keyboard controls a pulse pattern generator PPG from which pulses can be passed to an input store IS under the control of an input control IC associated with which is a decimal point store DPS. The machine also includes an accumulator store AS and associated output control OC and decimal point store DPS.

Before considering the operation of the machine it is useful first to consider the principle of subtracting by adding nines complements. Let us consider a simple subtraction of 57 minus 28 and let us add 57 to the nines complement of 28. We then have:

$$\begin{array}{r} 57 \\ 71 \\ \hline 128 \end{array}$$

If we now carry the "1" from the first column to the last column, we have:

$$\begin{array}{r} 28 \\ 1 \\ \hline 29 \end{array}$$

This principle holds for any two numbers provided that the unit which "overflows" from the highest-order column is transferred to the lowest-order column and added in.

As a further illustration using the same example we may write:

| | |
|---|---|
| | 0 0 0 0 5 7 |
| Nines complement of 28 | 9 9 9 9 7 1 |
| Sum:— | 1 0 0 0 0 2 8 |
| Carry the "1" | 1 |
| | 0 0 0 0 2 9 |

Having considered the process of subtraction it is now convenient to pass to the process of division, which can be regarded as repeated subtraction. In this process the steps are those of placing the nines complement of the first number into the accumulator store and then putting the second number into the input store, and then adding the two stores as many times as necessary until the remainder is less than the second and is no longer a true nines complement, at which step a "zero" will appear as described below. The second number is then "shifted" as it were one position to the right and is again added to the nines complement of the first number until the remainder in this position is no longer a true nines complement. The second number is then "shifted" again one position to the right and the process is repeated until either there is no remainder from the first number or until the result of the repeated subtraction processes is obtained in as many significant figures as can be shown or stored in the accumulator store. During this subtraction process the principle of "carrying" the unit from the highest-order to the lowest-order position is maintained.

Example: Divide 1886 by 82 (=23)
Initial condition     0 0 0 0 0 0 0 0   AS
                      0 0 0 0 0 0 0 0   IS Step:
1 Insert numerator into Input Store—          0 0 0 0 0 0 0 0  AS
                                               0 0 1 8 8 6 0 0  IS
2 Add "nines complement" into                  9 9 8 1 1 3 9 9  AS
   Accumulator Store AS:—                      0 0 0 0 0 0 0 0  IS
3 Insert denominator into Input Store          9 9 8 1 1 3 9 9  AS
   IS, adding the digit "1" to the first column 1 0 8 2 0 0 0 0  IS
4 Add IS into AS:—                             1 1 0 6 3 1 3 9 9  AS
   and "carry" the "1"                         1 0 6 3 1 4 0 0  AS The presence of a "zero," underlined, in the second column indicates that the denominator will not divide at this position—that is to say "82 into 18 won't go"—so we must reverse the subtraction already effected and then shift the position of the denominator relative to the numerator so as to attempt to divide 188 by 82. The subtraction is reversed by adding the nines complement of the denominator into the accumulator store when we will then arrive at the same number in the accumulator store as we had at Step 2, before trying to divide 18 by 82.

Step:
4                                                                    1 0 6 3 1 4 0 0  AS
                                                                     =
5  Add nines complement of denominator to
   Accumulator Store:—                                               8 9 1 7 9 9 9 9

Sum:—     9 9 8 1 1 3 9 9  AS
6  "Shaft" denominator in Input Store one
   position to right:—                                               0 1 0 8 2 0 0 0  IS and add IS to AS              Sum:—    1 0 0 8 9 3 3 9 9  AS
   and "carry" the "1"                    0 0 8 9 3 4 0 0  AS
7  Again add IS to AS:—                   0 1 9 7 5 4 0 0  AS
8  Again add IS to AS:—                   0 3 0 5 7 4 0 0  AS
                                          =

We now have again a "zero" in the accumulator store, this time in the third position. We therefore must retrace the last step, "shift" the denominator one position to the right and try again.

Step
8                                                    0 3 0 5 7 4 0 0  AS
9  Add nines complements of IS:—                     9 8 9 1 7 9 9 9

Sum:—   1 0 1 9 7 5 3 9 9  AS
   and "carry" the "1":—                            0 1 9 7 5 4 0 0  AS
10 "Shift" denominator in IS
   one position to the right:—                      0 0 1 0 8 2 0 0  IS and add IS to AS     Sum:—    0 0 2 0 8 3 6 0 0  AS
11 Add IS to AS         Sum:—    0 0 2 1 9 1 8 0 0  AS
12 Again add IS to AS   Sum:—    0 0 2 3 0 0 0 0 0  AS
                                 = = = = =

13 Detect all zeros (underlined) and stop operation.

It will be noticed that information is inserted into the input store with the first two positions left blank so as to leave two spaces for registering the first two digits of the answer in the accumulator store. As the division operations proceed more positions are cleared in the accumulator store for registering subsequent digits of the answer. These two positions, and the subsequent positions as the division proceeds, count each operation or in other words count the number of times the number in the input store has been divided into the number represented by the nines complement in the accumulator store.

Having now described the principle of operation of the machine, certain details of some of the parts of the machine will now be considered.

The arrangement of the input and output controls and of the Decimal Point Stores together with the manner in which these controls and stores are associated with the Accumulator and Input Stores is described in detail in co-pending U.S. application Serial No. 410,582 to which reference should be made.

It is however of some interest to consider how the process of obtaining a nines complement is carried out. Referring to FIGURE 2, this illustrates an arrangement of an Input Store IS comprised by a series of cold-cathode stepping tubes as described in co-pending U.S. applications 331,676, 331,677 and 331,678.

These tubes are associated with an output control formed by a chain of trigger tubes and with a bi-stable switching circuit FF which applies pulses to a train of trigger tubes forming an Input Control. Each Input Control tube controls one inter-stage gate of an Accumulator Store AS formed by a further chain of stepping-tubes. This arrangement is described in greater detail in co-pending U.S. application Serial No. 410,582.

The order to transfer the nines complement of a number in the IS into the AS the operation of the FF is in effect reversed from the arrangement described in U.S. application Serial No. 410,582 and the line J is switched to a positive potential by a pulse TEP derived from the trailing edge of the first pulse of the train of ten pulses. Adopting this method the first pulse of the train is ignored by the circuit and the "nines" complement is obtained instead of the "tens" complement.

With this arrangement pulses read out from one stage of IS will be added into the corresponding stage of AS until the discharge reaches the KO cathode of the appropriate tube in the IS. By means of the OR gate shown in FIGURE 2, FF is also reset by the pulses which step the IC and OC chains.

Either of the two above mentioned pulses will reset the FF i.e. remove the positive bias from line J and the remainder of the pulses, if any, will not cause stepping of the corresponding tube in AS.

In the above description reference has been made to the process of "shifting" a number in the input store one position to the right when performing a subtraction. In fact no shift actually takes place and the number in the input store remains the same, but a shift is simulated by providing the facility of comparing information in any position in the input store with information in any position in the accumulator store. This facility is provided by the arrangement of input and output controls described in co-pending application Serial No. 410,582.

As an example consider the operation of transferring the nines complement of the digit "seven" stored in V$t$, that is to say the "tens" tube of the Input Store, into the Accumulator Store. A train of ten pulses is applied along the line APL; the first two pulses are applied to the "A" guides GA of V$t$ in the Accumulator Store and cause that tube to step two positions. The other pulse of the train of ten causes the discharge in V$t$ of the Input Store to rest on K0 and operates the circuit FF in sufficient time to prevent the pulse, applied along line APL from operating tube V$t$ in the Accumulator Store. The circuit FF then remains in this condition for the rest of the train of pulses so that we have counted "two" into the Accumulator Store by a process involving the reading of "seven" in the Input Store.

The bi-stable circuit FF is provided with a reset connection which, at the end of the train of ten pulses, causes it to reassume its original condition ready for the reset of further trains of pulses as required. This reset facility can also be used to change the condition of the circuit FF when it is desired to change from a subtraction or division process to a multiplication or addition process or vice versa.

What we claim is:

1. A computing machine comprising an accumulator store having a chain of digit storing cold cathode stepping tubes, a source of counting pulses, means applying said counting pulses to said accumulator store for storing a first number therein, an input store having a series of digit storing cold cathode stepping tubes, means applying said counting pulses to said input store for storing a second number therein, and subtracting means for subtracting said second number from said first number by nines complement addition, said subtracting means comprising common means for applying a series of ten stepping pulses to corresponding digit position cold cathode stepping tube stages of said input and accumulator stores, and pulse responsive means blocking the first of said ten pulses from said accumulator store and responsive to the presence of a pulse at the highest stepping position of each of said stepped input store cold cathode tube stages to electrically isolate said stepped accumulator store cold cathode tube stage from said common means.

2. The combination of claim 1 wherein said accumulator store includes a plurality of two input coincident gates each respectively controlling the stepping input of each of said accumulator store cold cathode stepping tubes, a common line, said pulse responsive means comprising a bistable switch, said switch responsive to the trailing edge of the first of said ten pulses for switching to the first of said bistable switch states, means responsive to said first state for applying a first potential to said common line, means coupling said common line to one input of said two input coincident gate, said common means comprising the other input of said gate, said first potential being sufficient to open said gate and allow pulses introduced upon said common means to step said accumulator store, and means connecting said switch to said highest stepping position of each of said input store tube stages for changing the state of said switch to the second state thereof in response to the presence of a pulse at said highest stepping position, and means responsive to said second state for applying a second potential to said common line, said second potential being insufficient to maintain said gate in open position and thereby blocking the remainder of said ten pulses from stepping said accumulator store tube.

References Cited by the Examiner

UNITED STATES PATENTS

| | | | |
|---|---|---|---|
| 2,973,901 | 3/1961 | Petherick et al. | 235—160 |
| 3,018,957 | 1/1962 | Havens | 235—159 |
| 3,031,139 | 4/1962 | Spingies et al. | 235—160 |
| 3,120,606 | 2/1964 | Eckert et al. | 235—160 |

OTHER REFERENCES

R. K. Richards: Arithmetic Operations in Digital Computers, Van Nostrand (1955), pages 241–246.

MALCOLM A. MORRISON, *Primary Examiner.*

K. MILDE, *Assistant Examiner.*